Sept. 28, 1965   U. T. JOYNER   3,208,694
NOSE GEAR STEERING SYSTEM FOR VEHICLE WITH MAIN SKIDS
Filed March 20, 1964                           4 Sheets-Sheet 1

INVENTOR
UPSHUR T. JOYNER

BY
ATTORNEYS

INVENTOR
UPSHUR T. JOYNER
ATTORNEYS

Sept. 28, 1965    U. T. JOYNER    3,208,694
NOSE GEAR STEERING SYSTEM FOR VEHICLE WITH MAIN SKIDS
Filed March 20, 1964    4 Sheets-Sheet 4

INVENTOR
UPSHUR T. JOYNER

BY

ATTORNEYS

United States Patent Office 3,208,694
Patented Sept. 28, 1965

3,208,694
NOSE GEAR STEERING SYSTEM FOR VEHICLE WITH MAIN SKIDS
Upshur T. Joyner, Hampton, Va., assignor to the United States of America as represented by the Administrator of the National Aeronautics and Space Administration
Filed Mar. 20, 1964, Ser. No. 353,637
17 Claims. (Cl. 244—50)
(Granted under Title 35, U.S. Code (1952), sec. 266)

The invention described herein may be manufactured and used by or for the Government of the United States of America for governmental purposes without the payment of royalties thereon or therefor.

This invention relates generally to means for steering a vehicle and more particularly to a steering system for a vehicle having main gear skids and a swiveling nose gear.

Generally, the directional stability of a vehicle, especially an aircraft, is maintained during landing by means of either utilization of the aerodynamic forces acting upon the control surfaces of the vehicle or by means of selective braking on the main wheels or, at relatively low speeds, the nose gear or forward support is turned to provide positive steering. Some experimental aircraft utilize a freely swiveling nose gear and rear supports or main gears which have skids rather than wheels which are much heavier and difficult to store, as well as presenting problems due to reentry heat. In such vehicles, there is little or no means for maintenance of directional control once aerodynamic control is lost. It thus becomes necessary for the vehicle to utilize lakebeds or other large, level surface areas for landing and slideout or test runs. In a vehicle having main gear skids and a freely swiveling nose gear, lateral forces cause the vehicle to veer from a straight-line direction of travel. Any attempt to control the direction of travel of the vehicle by steering the nose wheel in the conventional manner, for example, manual control of the steer angle of the nose wheel, leads to lack of directional stability, loss of control and possible ground looping.

The present invention overcomes the above problems by applying a limited torque about the axis of a swiveling nose gear which causes the nose wheel to be skewed to the direction of travel of the vehicle and thereby establishes a ground reaction force. Proper adjustment of the amount of limited torque and, consequently, the ground reaction applied permits effectuation of a state of equilibrium in which the moments created by forces acting on the vehicle in one direction are equal to and opposed by moments in the opposite direction and a direction of travel may be established.

Accordingly, it is an object of this invention to provide means for steering an aircraft equipped with main gear skids and a swiveling nose gear by utilizing ground reaction forces.

Still another object of this invention is to provide a steering system for an aircraft having main gear skids and a nose wheel that maintains directional stability during slideout after landings.

Another object of this invention is to provide torque applied to a forward wheel support to steer a vehicle while maintaining directional stability.

Yet another object of this invention is to provide means which permit steering of an aircraft after aerodynamic control is lost.

Another object of this invention is to provide flexibility of choice of landing sites for high-speed aircraft and reentry space vehicles.

It is a further object of this invention to provide means for creating a moment about the nose gear steer axis such as to create a nose wheel moment around the center of gravity of an aircraft which is at all times equal and opposite in direction to the summation of the moments resulting from all other forces acting upon the aircraft during landing and slideout.

Another object of this invention is to provide a fluid motor into which a fluid is forced under controlled conditions of pressure and direction to create a moment about the nose gear that permits steering and retention of directional stability of an aircraft.

Still another object of this invention is to provide a steering system for a vehicle which utilizes control means for determining the amount and direction of pressure applied to a fluid motor acting upon a swiveling support in order to create a moment thereabout and cause a lateral force that opposes the prevalent external force acting upon the vehicle and thus permits maintenance of directional stability and direction of travel of the aircraft.

Another object of the present invention is to provide a method for steering a vehicle by applying a compensating moment about a wheel support.

Generally speaking, the foregoing and other objects are accomplished in accordance with this invention by application of a limited torque to the steer axis of the nose gear of the vehicle. Usually the nose gear is freely swiveling and has little or no effect upon the direction of travel of the vehicle. However, by providing a fluid motor, or its equivalent, to apply a controlled amount of moment about the swivel axis of the nose gear of the vehicle, there is provided the ability to steer the vehicle and maintain its directional stability. A steering wheel or equivalent means is provided for initiating the amount and direction of the torque to be applied about the swivel axis of the nose gear. Movement of the initiator means establishes the direction and amount of fluid pressure which is applied to the motor and, accordingly, determines the amount of moment applied about the swivel axis of the nose gear. While the moment or limited torque is applied to the swivel axis, the nose gear is permitted to retain its swiveling characteristic, but the moment causes the nose wheel to be yawed or skewed to the direction of travel of the vehicle and thereby creates a reaction force with the ground which acts to steer and maintain directional stability of the vehicle during slideout. As used herein, limited torque refers to a situation wherein the steering power applied to the essentially freely swiveling nose gear is selected and maintained to provide a fixed lateral reaction between the nose wheel and the landing surface thereby maintaining the steering moment, $M_2$, at the value selected.

A more complete appreciation of the invention and many of the attendant advantages thereof will be readily apparent as the same becomes better understood by reference to the following detailed description when considered in connection with the accompanying drawings wherein.

Figure 1:
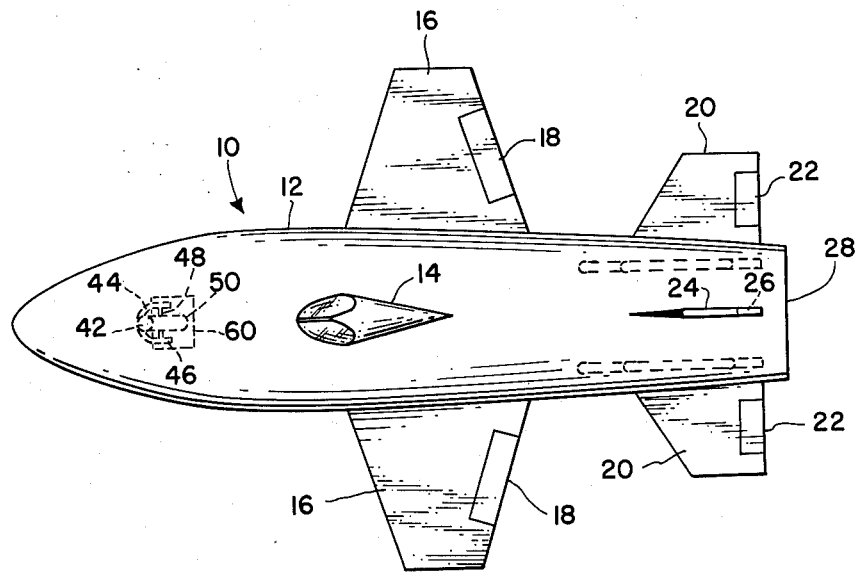
FIG. 1 is a plan view of an aircraft to which the invention applies.

Referring now to the drawing wherein like reference numerals designate identical or corresponding parts throughout the several views, and more particularly to FIG. 1 wherein the aerodynamic body or vehicle, generally designated by reference numeral 10, is shown as having main body or fuselage 12 which has canopy 14. Attached to fuselage 12 are wings 16 having control surfaces or ailerons 18 and stabilizer 20 which has control surfaces or elevators 22. Tail fin 24 has control surface or rudder 26 located adjacent vehicle after-portion 28 which is normally utilized for exhaust from the engine.

Figure 2:
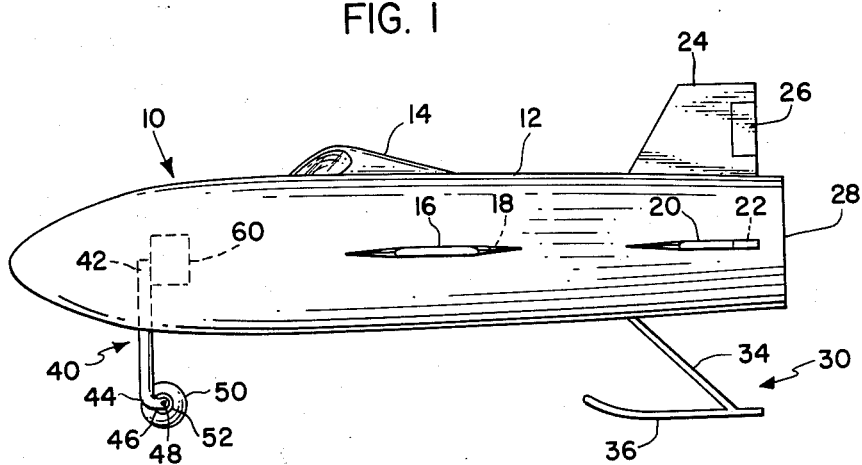
FIG. 2 is an elevation of the aircraft of FIG. 1.

Vehicle 10, as is more clearly shown in FIG. 2, is provided with a pair of rear supports 30 having diagonal energy absorbing members 34 to which are secured skids 36. Skids 36 are of conventional configuration and structure. The forward portion of vehicle 10 is supported by means of nose gear 40. Support 40 has the normal construction for a swiveling nose gear which includes vertical shaft 42 which is bifurcated at 44 adjacent the ground end thereof. Bifurcated portion 44 has arms 46 extending therefrom and in which is journaled wheel axle 48. Wheel 50 is mounted upon wheel rim 52 that in turn is mounted for rotation about axle 48.

Figure 6:
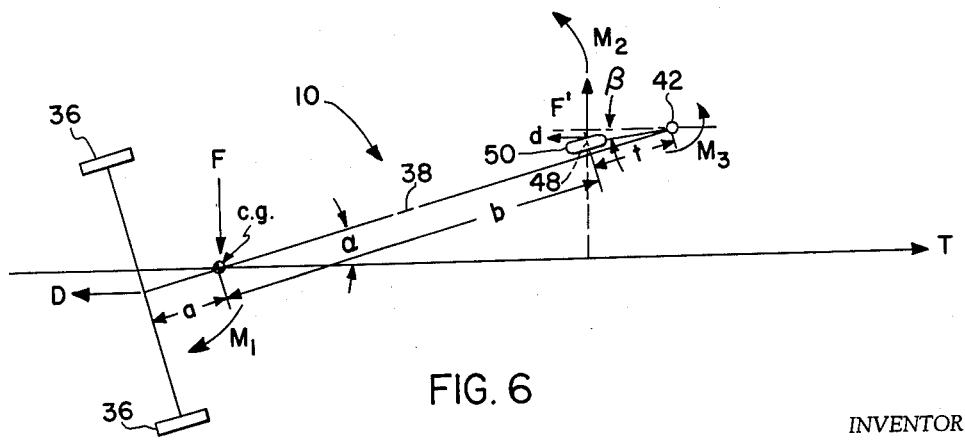
FIG. 6 is a schematic showing the moments and forces acting upon a typical vehicle employing the instant invention.

FIGURE 6 shows aircraft or vehicle 10 being steered in direction of travel T in the presence of lateral force F at center of gravity C.G. resulting from a side wind, a lateral slope in the runway surface, or in the case of a curved direction of travel, a centrifugal force. In any event, an equal and opposite force must be applied to the vehicle in order for it not to depart from the desired direction of travel. The main skids develop a ground reaction only in a direction opposite to the direction of travel, not laterally as main gear wheels do when yawed slightly. Consequently, the only place where an equal and opposite ground force can be developed is at the nose wheel. This can be done by forcing the nose wheel to travel at a yaw angle to the desired direction of travel, but it must be done in such a way that the aircraft is not made directionally unstable, as in the case of positive angular displacement steering of nose wheels in combination with main gear skids.

The schematic of FIG. 6 shows vehicle 10 as having center of gravity C.G. located distance $a$ from a line joining the center of main gear skids 36 and distance $b$ from nose gear wheel axle 48. Nose gear wheel axle 48 is distance $t$ from nose gear shaft or swivel axis 42. Main gear skids 36 develop drag force D and nose wheel 50 develops drag force $d$. Vehicle or aircraft 10 is shown as having centerline 38 extending at yaw angle alpha to direction of travel T and nose wheel 50 as extending at yaw angle beta. In order to more fully understand the present invention, consider the moments about center of gravity C.G. caused by the ground forces indicated in FIG. 6. Drag force D of main gear skids 36 applies moment $M_1 = D(a \sin \alpha)$ about center of gravity C.G. in such a direction as to tend to line the vehicle with direction of travel T, or decrease angle of yaw alpha while the resultant ground force on yawed nose wheel 50 produces moment $M_2 = (f'b \cos \alpha + db \sin \alpha)$ in a direction tending to increase angle of yaw alpha. Since $d$ is very small, it can be neglected. Thus, it is seen that moment $M_1$ must be equal to moment $M_2$ in order to have vehicle 10 travel in the desired direction of travel T in the presence of side force F. Moment $M_2$ is regulated by applying a torque moment $M_3 = (f't \cos \beta + dt \sin \beta)$ about nose gear swivel axis 42. For a given value of lateral force F', a given wheel or tire 50 has a definite value of yaw angle beta.

Considering now the directional stability of vehicle 10 when moment $M_3$ is held constant by means of suitable control devices at such a value that the resulting moment $M_2$ is made equal to moment $M_1$. If vehicle 10 is deflected in such a way as to increase angle of yaw alpha, the sine of alpha increases and stabilizing moment $M_1$ increases, while for moment $M_2$ the cosine of yaw angle alpha decreases and destabilizing moment $M_2$ decreases. Thus, vehicle 10 returns to its original value of yaw angle alpha. If yaw angle alpha is decreased, the same line of reasoning will show that vehicle 10 returns to its original direction of travel T. The vehicle is, therefore, directionally stable and will travel in the desired direction of travel T at a constant yaw angle alpha which is controlled by the applied constant steering torque $M_3$ which is suitably selected for the amount of lateral force F'. It must be remembered that nose-wheel yaw angle beta, is controlled only by the steering torque $M_3$ and remains constant at any one steering torque setting and is not affected by perturbations of yaw angle alpha as in the case of positive angle steering.

Figures 7, 9:
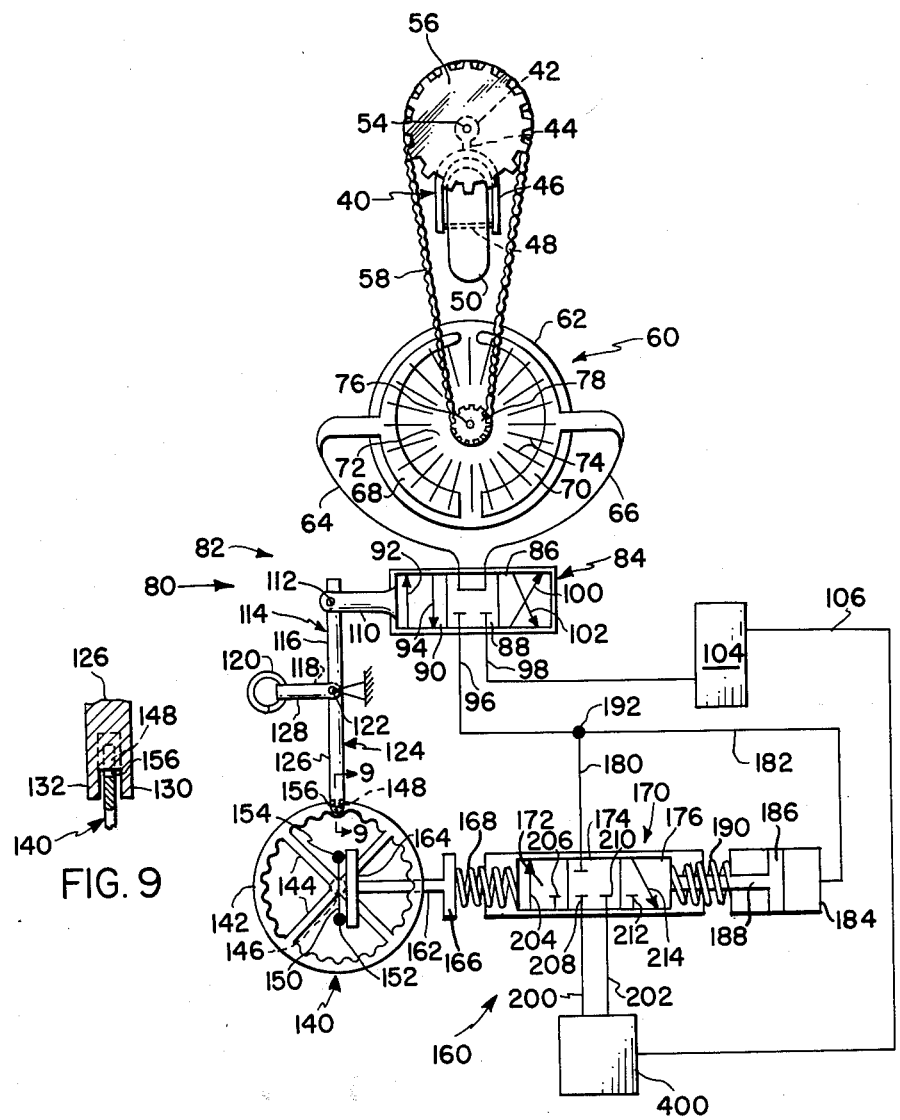
FIG. 7 is a diagrammatic view showing one embodiment of the instant invention wherein a mechanical linkage connects the components of the system.

FIGURE 7 shows a schematic of a mechanical system for operating and providing the limited torque which accomplishes the objective of the instant invention. The upper portion of shaft 42 has spindle 54 to which sprocket 56 is rigidly secured. Sprocket 56 may be of a size for increasing or decreasing the power ratio as design criteria require and is adapted to receive chain 58 which is comprised of several links or is of any well known construction. Sprocket 56 is secured on spindle 54 so as to rotate the same amount as the steer angle of nose wheel 50 and nose gear shaft 42. As is more clearly shown in FIG. 7, power supply 60 is a fluid motor or its equivalent. The motor has casing 62 to which are secured fluid lines 64 and 66. These fluid lines extend through casing 62 and are connected to entry ports 68 and 70 which are in communication with a central rotor 72. Rotor 72 is provided with vanes 74 and sprocket shaft 76 to which is secured sprocket 78. The above described construction for fluid motor or power supply 60 is conventional and any well known similar type of motor may be utilized. It is also recognized that the above described drive train is only one of many possible constructions for connecting power supply 60 to nose gear 40.

Chain 58 interconnects sprockets 56 and 78 and thereby transfers the energy or limited torque from power supply 60 to vertical nose gear shaft 42. It is to be noted that motor 60, as shown in FIG. 7, is such that the fluid flow-through lines 64 and 66 are essentially interchangeable and thus the fluid pressure exerted against vanes 74 may be in either of two directions to effect clockwise or counterclockwise rotation of shaft 42.

Mechanical controller 80 has initiator 140, direction control 82 and pressure regulator 160 which are interconnected to govern the operation of power supply 60. Direction control 82 utilizes a three-section valve 84 which may be of the conventional spool type or its equivalent. The schematic of FIG. 7 shows valve 84 as having three sections 86, 88, and 90. The fluid lines extending through each of the sections of valve 84 are respectively designated as 92, 94, for section 90; 96 and 98 are stop lines in section 88, and lines 100 and 102 are reverse flow lines in section 86. Reverse flow lines 100 and 102 permit flow of pressurized fluid from line 96 to enter motor 60 via line 66 and thereby establish clockwise rotation of rotor 72. In such circumstances, line 102 functions as a discharge conduit for fluid flowing from motor 60 into sump line 98. Stop lines 96 and 98 extend to other portions of controller 80 as will be described more fully hereinafter. However, it is shown that line 98 extends to a line sump chamber 104 which has fluid line 106 that extends to main sump 400. Line sump chamber 104 is of conventional construction and functions to prevent a delay of action or sucking of air when a reversal of flow occurs. Line 96 is the main pressure line extending from T 192 to provide a conduit for the fluid which activates power supply 60.

Attached to the spool of valve 84 is rod 110 which is pivoted at 112 to leg 116 of a pair of L-shaped levers 114 and 124. Lever 114 has leg 116 and arm 118 and lever 124 has leg 126 and arm 128. One of the arms 118 or 128 overlies the other and the two are pivoted to fixed fulcrum point 122. The free ends of arms 118 and 128 are interconnected by means of a circular or coil spring 120. To complete the linkage of valve 84 and initiator 140, leg 126 of lever 124 is provided with flanges 130 and 132, see FIG. 9, extending from the outer portions thereof and interior boss 148.

Initiator 140, as shown in FIG. 7, has steering wheel 142 with cross braces 144 mounted on central column 146 as is well known and conventional. The rim of the wheel 142 is notched at 156 to accommodate boss 148 on lever 124. As is more clearly shown in FIG. 9, flanges 130 and 132 and boss 148 form a channel which encounters the rim of wheel 142 with boss 148 extending into notch 156. Flanges 130 and 132 project over the faces of wheel 142. Thus, when wheel 142 is rotated sufficiently far, boss 148 leaves notch 156 but abuts the rim of wheel 142 and continues to cooperate with flanges 130 and 132 to maintain the association of lever 124 with wheel 142. Initiator 140 further includes crossbar 150 which has enlarged portions or shoulders 152 and 154 at the ends thereof and which are fixedly attached to central column 146.

Regulator 160 has I-shaped member 162 that is provided with flanges 164 and 166. Flange 164 is located so as to be operated by movements of crossbar 150 and shoulders 152 and 154. Spring 168 extends between flange 166 and the interior of a second three-section valve 170. Valve 170 is also of conventional construction, such as a regulator spool valve, wherein the through passages are such as to permit a variable flow. Section 172 of valve 170 has through line 204 and stop line 206. Central valve section 174 has two stop lines 208 and 210 and third section 176 has stop line 212 and reverse through line 214.

The interior of valve 170 reacts with piston 186 and piston rod 188 which are encased by cylinder 184. Spring 190 extends from the interior of valve 170 to cylinder 184 to function in association with spring 168 for neutrally positioning valve 170. Fluid pressure lines 180, 182, and 200 are shown, in FIG. 7, as being capable of communication with one another via valve line 204. Fluid line 202 extends to basic sump 400. Thus, it is seen that fluid pressure provided by conventional means, not shown, would go through lines 200 and 180 to T 192 from which it would flow into lines 96 and 182. Line 182 being in communication with cylinder 184.

Figure 8:
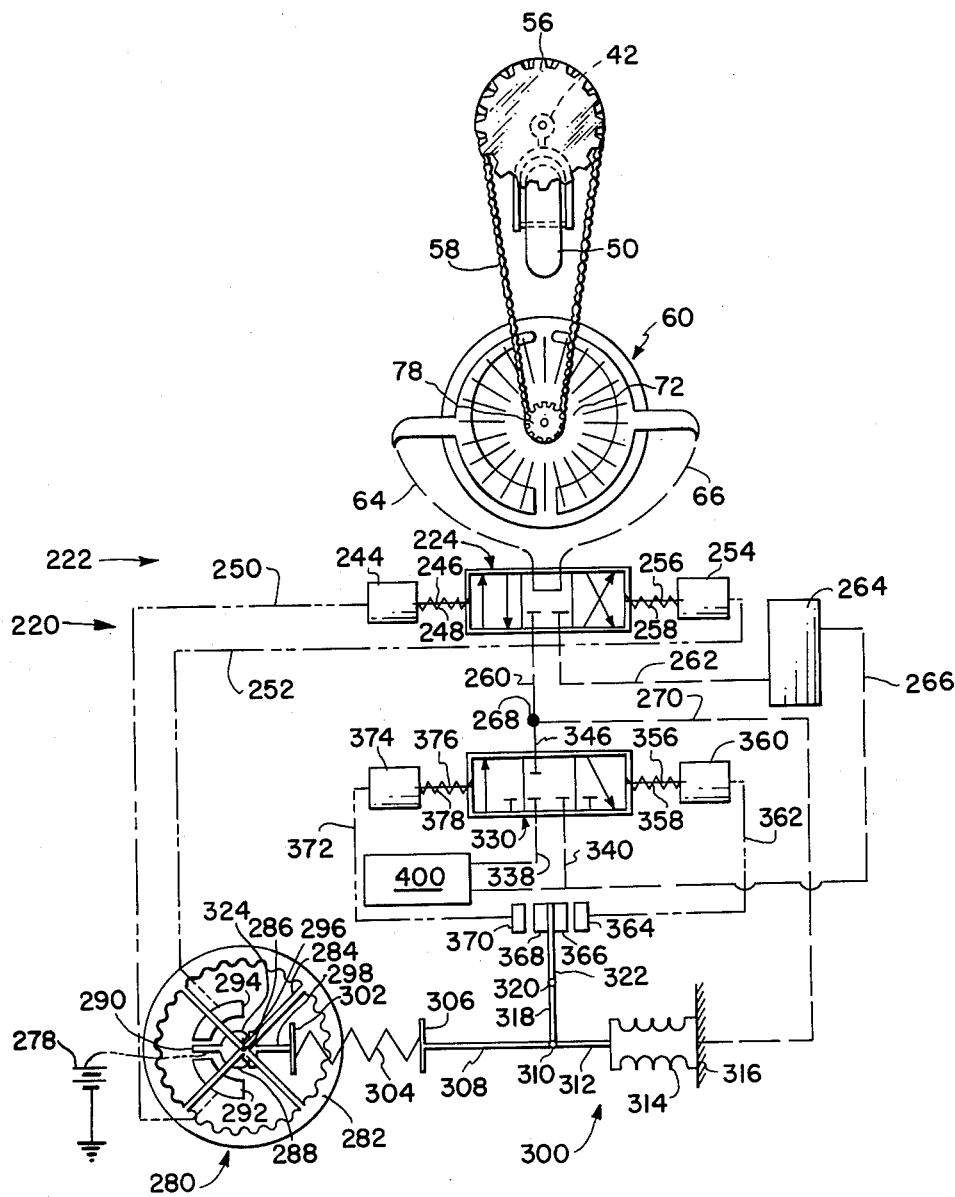
FIG. 8 is a diagrammatic view of another embodiment of the invention which has an electrical system for coordination of components.

The embodiment shown in FIG. 8 has substantially the same nose gear structure and power supply 60 as described with reference to the embodiment of FIG. 7. Basic electrical controller 220 is comprised of direction control 222 and pressure regulator 300, a well as initiator 280. Direction control 222 has a three-section or spool valve 224 which is placed adjacent and so as to be in communication with power supply 60 via fluid lines 64 and 66. Valve 224 is identical to previously described valve 84 and accordingly the description of valve 84 is applicable to valve 224 and will not be repeated here.

Solenoid valve operators 244 and 254 are each placed adjacent an opposite end of valve 224. Solenoid rods 246 and 256 extend from solenoid valve operators 244 and 254 to the ends of the interior portion, such as the spools, of valve 224. Springs 248 and 258 also extend between the solenoid valve operator casings, or similar fixed structures, and the ends of the interior portion of valve 224 and act not only as centering and neutral positioning means, but also to resist any sudden forces which might be directed against valve 224. Wires 250 and 252 respectively connect solenoid valve operators 244 and 254 to initiator 280 now to be described.

Initiator 280 is of conventional construction. That is, it may be a steering mechanism having wheel rim 282 with cross braces 284 mounted and rotatable upon shaft or column 286. Cam 288 functions as a selector and is secured to initiator or steering mechanism 280 and has projections or bosses 324 and contact arm 290. An electrical power source 278 is connected with cam 288 and contact arm 290 in such a manner that, as initiator 280 is rotated, contact arm 290 abuts or slides across contact 292 or 294. Contacts 292 and 294 are respectively attached to electrical wires 250 and 252 so that electrical current from the power source 278 may flow selectively to either solenoid valve operator 244 or 254.

Fluid line 260 provides a supply of pressure-regulated fluid which is permitted to flow into either of the power supply flow lines 64 and 66 depending upon the position of valve 224. Fluid line 262 acts as a sump line or pressure-relieving line leading to sump chamber 264 which functions to prevent suction of air when a reversal of flow occurs. Sump line 266 extends from chamber 264 to primary or basic fluid supply container 400. Pressurized fluid line 260 connects with T 268 which has another pressurized fluid line 270 connected to a second of the three outlets. Fluid line 270 extends to pressure regulator 300 to function as will be described more fully hereinafter.

Rotation of initiator or steering mechanism 280 forces bosses 324 against I-member 298 which has flanges 296 and 302. Thus, as cam 288 and bosses 324 are rotated, the latter contact flange 296 to cause movement thereof toward the right as shown in FIG. 8. Spring 304 is attached to flange 302 at one end and to plate 306 at the other end. Bar 308 is attached to plate 306 at one end and extends to lever 318 to make contact therewith at pivot point 310. A second bar 312, or an extension of bar 308, also contacts lever 318 at pivot point 310 on one end and pressure bellows 314 at the other end. Bellows 314 is secured at a fixed location 316 and is adapted to receive fluid from pressurized fluid line 270.

Lever 318 pivots about fulcrum point 320 and has extended portion 322 which has contact points 366 and 368 secured to opposing sides thereof. Contact points 366 and 368 respectively engage contacts 364 and 370 to permit the flow of electricity through wires 362 or 372. Wires 362 and 372 are respectively attached to solenoid valve operators 360 and 374. Solenoid valve operator 360 has rod 356 and spring 358 attached thereto and extending to three-section or spool valve 330. Regulator valve 330 is identical to valve 170 and the previous description of the latter applies equally here. Solenoid valve operator 374 is provided with rod 376 and spring 378 which extend to the end of valve 330 opposite to that of rod 356 and its associated spring 358. Thus springs 358 and 378 act to position valve 330 in a neutral position in the absence of an electrical current activating either of solenoid valve operators 360 or 374.

Pressurized fluid line 338 extends from the primary or basic fluid container and fluid therein will pass through valve 330 and to pressurized fluid line 346 which extends into three-way connector 268. Fluid line 340 acts as a relief line and serves to drain excess fluid in the system back into primary or basic fluid container 400 when pressure is being reduced.

*Operation*

Referring now to FIG. 7, as initiator 140 is rotated, L-shaped lever 124 is caused to rotate which in turn rotates L-shaped lever 114 about the fixed fulcrum 122. Coil spring 120 acts to allow lever 124 to move as far as required by initiator 140 after valve 84 has moved through its full stroke and provides for a continuous application of force to rod 110. Since rod 110 is in communication with valve 84, movement of wheel 142 effects a movement of valve 84 in either of two directions.

Movement of initiator 140 not only moves L-shaped levers 114 and 124, but also causes rotation of crossbar 150 and its shoulders 152 and 154. Such a movement causes flange 164 and I-shaped member 162 to move to the right, which in turn causes valve 170 to be displaced.

With initiator 140 in a neutral position, centering springs 168 and 190, as well as L-shaped levers 114 and 124, maintain valves 84 and 170 in a neutral position. Upon rotation of initiator 140 to the left, valve 84 is forced to the right thereby placing lines 92 and 94 respectively in communication with fluid lines 96 and 98 and 64 and 66.

The same left rotation causes member 162 to move and push or cause valve 170 to move to the right. Consequently, fluid pressure lines 200, 204, and 180 come into communication with one another and fluid pressure flows from line 200 to line 204 and then into line 180. From line 180 it goes into T 192 and then flows into lines 96, 92, 64, and into power supply 60. The fluid under pressure flows through port 68 where it impinges on vanes 74 which causes counterclockwise motion of rotor 72 and then enters port 70 and flows out through fluid line 66. Since fluid line 66 is brought into communication with fluid line 98 by line 94 of section 90 of valve 84, the fluid flows into sump chamber 104 and from the chamber into sump line 106.

The pressurized fluid enters cylinder 184 and acts against piston 186 and piston rod 188. As long as pressure or force is exerted against I-member 162 by initiator 140, valve 170 remains in its displaced position permitting a regulated amount of pressurized fluid to flow therethrough. However, when the pressure in line 182 and cylinder 184 causes a force against piston 186 sufficient to overcome the force provided by initiator 140, valve 170 is returned to a neutral position. This places central section 174 of valve 170 in a position such that stop lines 208 and 210 come into communication with fluid lines 180 and 200. Accordingly, the fluid is prevented from flowing into the motor and the pressure flowing to fluid motor 60 is regulated to an amount determined by the displacement of initiator 140.

The fluid which enters power supply or fluid motor 60 through fluid line 64 and port 68 reacts with vanes 74 and rotor 72 which has secured thereto shaft 76 and sprocket 78. As the fluid causes rotation of rotor 72 and the attendant elements, chain 58 is caused to rotate and, since sprocket 56 is rigidly secured to shaft 42, a torque is applied to the nose gear steer axis and to wheel 50. It is readily apparent that upon rotation of initiator 140 or wheel 142 to the right, a similar chain of events would occur which would cause movement of valve 84 in a direction opposite to that previously described.

The pressure in line 182 and cylinder 184 tends to counteract the force provided by initiator 140. Therefore, the fluid pressure in line 180 is regulated by valve 170 and only a limited amount of fluid flows into power supply 60. This establishes the amount of limited torque. Should wheel 142 be rotated to the right, it is apparent that valve 84 would be moved to the left thereby putting line 100 in communication with lines 96 and 66 and line 102 would then connect lines 64 and 98. In such a situation, the pressurized fluid coming from supply line 200 would enter power supply 60 from fluid line 66 to react against vane 74 in the vicinity of port 70. It would flow from port 70 into port 68 and then into line 64 which would become a discharge line in communication with sump line 102 of valve 84. From valve 84 the fluid would flow to line sump chamber 104 via line 98 and then into sump line 106 and eventually would be stored in primary storage chamber 400.

As will be evident from the description hereinafter, the embodiment of the invention of FIG. 8 operates in a manner similar to that of the embodiment shown in FIG. 7. Rotation of initiator 280 provides contact of arm 290 with either of contact points 292 or 294 to permit selective energization of solenoid valve operators 244 or 254 by means of electrical current flowing through either wire 250 or 252. Counterclockwise rotation of initiator 280 causes contact arm 290 to abut or slide over contact point 292 allowing electricity to flow through wire 250 to solenoid valve operator 244. When solenoid valve operator 244 is energized, it acts to force valve 224 to the right which permits interconnection of pressurized fluid line 260 with motor fluid line 64. This causes a counterclockwise rotation of rotor 72 and the associated sprockets 78 and 56. The counterclockwise rotation of sprocket 56 causes a similar rotation of wheel 50 and the consequent establishment of a ground reaction force.

The discharge fluid leaves power supply 60 via fluid line 66 and sequentially passes into fluid line 262, line chamber 264 and sump line 266. The counterclockwise rotation of initiator 280 also causes cam 288 and bosses 324 to act against flange 296 and forces I-shaped member 298 against coiled spring 304 and its associated plate 306. As plate 306 is forced to the right, it acts with bars 308 and 312 through pivot point 310 and causes lever 318 and its extension 322 to pivot about point 320. Contact 368 abuts contact point 370 to permit energization of solenoid valve operator 374. As solenoid valve operator 374 is energized, it causes connector rod 376 and spring 378 to force valve 330 to the right and permit flow of the pressurized fluid in line 338 to pass into pressurized fluid line 346 and subsequently to enter three-way connector 268. The fluid in three-way connector 268 flows into fluid lines 260 and 270. The flow of pressurized fluid in line 260 passes to valve 224 and establishes rotation of power supply 60 as described hereinabove.

The fluid flowing into line 270 enters bellows 314 at point 316 where bellows 314 is secured in place. The pressure in bellows 314 created by fluid from line 270 acts to force bar 312 back into a neutral position and thus to separate contact points 368 and 370. When the force exerted by bellows 314 becomes greater than the force caused by spring 304 and rotation of initiator 280, bar 312 and lever 318 rotate so as to provide for contact of points 366 and 364, thus energizing solenoid valve operator 360. When solenoid valve operator 360 is energized, it acts to force valve 330 to the left, as shown in FIG. 8, and thereby to prevent further flow of pressurized fluid into line 346. Thus, direction control 222 serves to determine the direction of rotation of wheel 50, while pressure regulator 300 determines the amount of fluid pressure to be applied to power supply 60 which creates the limited torque to be applied to nose gear shaft 42 and the associated nose wheel structure.

It is to be noted that the inherent characteristics of a fluid motor, such as power supply 60, permit a reversal of rotation direction upon application of sufficient torque by the nose gear to overcome the pressurized fluid flow, as well as permitting rotation in the same direction upon application of a torque causing such. Thus, it is seen that nose gear 40 retains its swiveling characteristic while application of the limited amount of torque causes nose wheel 50 to be yawed to the direction of travel of vehicle 10, thereby establishing a ground reaction force to permit steering of the vehicle.

Figures 3, 4, 5:
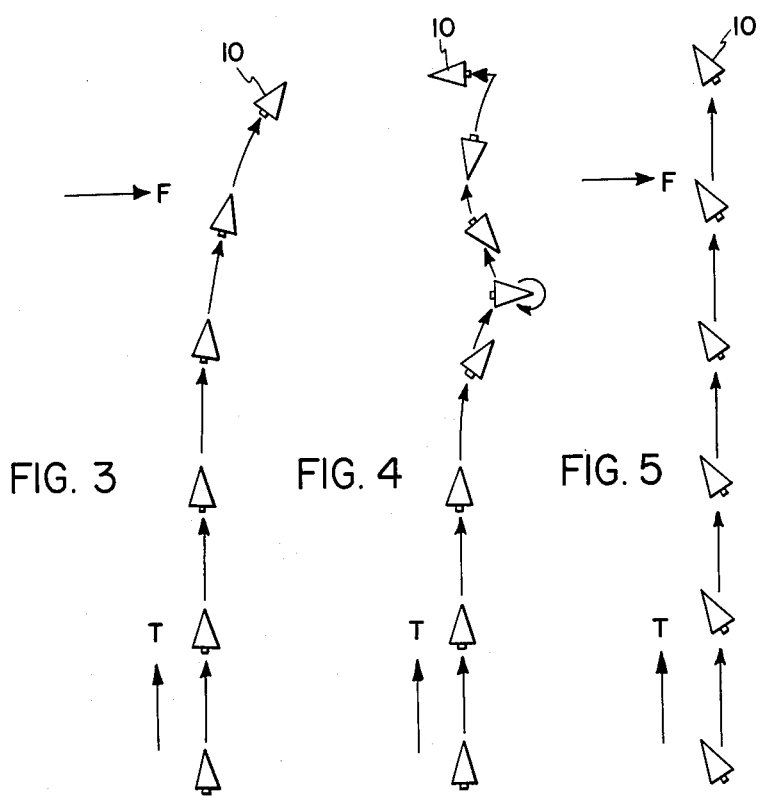
FIG. 3 is a schematic view of the direction of travel of a vehicle utilizing a freely swiveling nose gear.
FIG. 4 is a schematic view of the typical direction of travel of a vehicle having a prior art steering system which utilizes positive control.
FIG. 5 is a schematic showing the direction of travel of a vehicle having the system of the instant invention.

FIG. 3 shows a schematic of a typical landing path for a vehicle having a freely swiveling nose gear and main gear skids. The desired direction of travel is shown by arrow T and the resultant of external forces acting upon the vehicle is shown by arrow F. From this figure, it is apparent that the prior art structure of a freely swiveling nose gear would not permit a substantially straight line direction of travel in the presence of a side force and, accordingly, vehicles utilizing such a system require large areas for landing and slideout.

FIG. 4 shows another example of the prior art wherein a system is utilized which provides for steering of the vehicle by means of positive rotation of the nose gear. Regardless of whether external lateral forces are applied to the vehicle during landing and slideout, any rotation of the nose gear wheel causes lateral, or yaw, forces to react thereagainst with the consequent destabilization of the vehicle.

FIG. 5 shows a schematic of the path of landing and slideout for a vehicle utilizing the steering system of the present invention. Although the vehicle is yawed with respect to the direction of travel and skewed to lateral force F, it maintains a substantially straight direction of travel. Thus, the instant invention permits vehicles to land and continue slideout on narrow runways or in a narrow space without substantial lateral displacement by the frequently experienced forces due to lateral wind, crown, or lateral slope of the runway.

In view of the above, it is seen that the instant invention permits control of a vehicle such that a desired direction of travel may be maintained under stable conditions. Accordingly, vehicles, especially aircraft, now are able to travel on narrow surfaces even in the presence of lateral forces caused by such factors as cross-winds, slope of crown of the surface, or centrifugal force when the direction of travel is an arc.

Obviously, many modifications and variations of the subject invention are possible in the light of the above teachings. It is, therefore, to be understood that within the scope of the appended claims the invention may be practiced otherwise than as specifically described.

What is claimed as new and desired to be secured by Letters Patent of the United States is:

1. In an aircraft, the steering system comprised of: an aircraft having main gear skids; a swiveling nose gear having a wheel; power means for applying torque to said nose gear; initiator means for activating the system; director means for establishing the direction of torque applied; and regulator means including a valve having at least three positions for establishing the amount of torque to be applied to said nose gear, whereby reaction forces caused by the nose gear wheel being yawed to the direction of travel compensate for external forces acting upon the aircraft to maintain aircraft directional stability.

2. In an aircraft, the steering system of claim 1 wherein the initiator means is a steering wheel having associated therewith means for conveying a command to each of said director and regulator means.

3. In an aircraft, the steering system of claim 1 wherein the director means includes a valve having at least three positions for determining the direction of torque applied to said power means.

4. In an aircraft, the steering system of claim 1 wherein the initiator means includes a steering wheel having means associated therewith for conveying a command to said director and regulator means; and said director means is a valve having at least three positions for determining the direction of torque applied to said power means.

5. In a steering system, the combination comprised of: a vehicle having main gear skids and a swiveling nose gear with a wheel mounted thereon; a fluid motor; a drive train interconnecting said nose gear and said fluid motor; director means including a first spool valve; initiator means; a linkage extending between said initiator means and said director means; a regulator including a second spool valve and positioning means therefor; means connecting said initiator means and said regulator; a fluid supply source; and fluid lines connecting said valves with said fluid supply source and said fluid motor.

6. The steering system of claim 5 wherein said linkage is comprised of: a pair of L-shaped links pivoted on a fixed fulcrum; a spring connecting the ends of the arms of said links; one of said links having a boss on the end of the leg thereof which abuts said initiator means; and the end of the leg of the other link pivoted to a rod secured to said first spool valve.

7. The steering system of claim 5 wherein the means connecting the initiator means and said regulator is comprised of: a bar having shoulders secured to said initiator means; an I-shaped member having a first flange abutting said shoulders and a second flange to which is secured one end of a spring; and the other end of said spring abuts said second spool valve.

8. The steering system of claim 5 wherein said positioning means is comprised of: a three-way connector connecting two sections of one of said fluid lines; a second fluid line extending from said three-way connector; a cylinder; a piston rod secured to said second spool valve and having a piston located within said cylinder; a spring extending between said second spool valve and said cylinder; and said second fluid line being in communication with said cylinder.

9. The steering system of claim 5 wherein the linkage extending between the initiator means and the director means is comprised of: selector means; solenoid valve actuators located at each end of said first valve; connector rods and springs connecting each of said actuators to said first valve; and an electrical connection between said selector means and said solenoid valve actuators.

10. The steering system of claim 5 wherein the means connecting the initiator means and the second spool valve is comprised of: selector means having spaced bosses on one side thereof secured to said initiator means; an I-shaped member having a first flange abutting said bosses and a second flange; a spring having one end secured to said second flange and the other end to a plate from which extends a bar; one end of said bar pivoted to a lever mounted on a fulcrum; an extension of said lever having contact points attached to opposite sides thereof; contacts adjacent but spaced from said contact points; wires extending from said contacts to solenoid valve actuators located at each end of said second spool valve; connector rods and springs connecting each of said actuators to said second spool valve; and an electrical power source in communication with said selector means.

11. The steering system of claim 10 wherein said positioning means is comprised of: a three-way connector connecting two sections of a first of said fluid lines; a second fluid line extending from said three-way connector; an extension of said bar is secured to one end of a pressure bellows; and the other end of said bellows communicates with said second fluid line.

12. In an aircraft, the combination comprised of: a vehicle having main gear skids and a swiveling nose gear; a wheel mounted on one end of said nose gear; a sprocket secured to the other end of said nose gear; a fluid motor having a sprocket; a chain linking said sprockets; a first spool valve; fluid lines connecting said motor and first valve; initiator means for activating the system; a pair of L-shaped links pivoted on a fixed fulcrum; a spring connecting the ends of the arms of said links; one of said links having a boss on the end of the leg thereof which abuts said initiator means; the end of the leg of the other link being pivoted to a rod secured to said first spool valve; a second spool valve; a bar secured to said initiator means and having shoulders; an I-shaped member having a first flange abutting said shoulders and a second flange to which is secured one end of a spring; the other end of said spring being secured to said second spool valve; a fluid line extending from a fluid supply source to said second valve and to said first valve; a T connecting two sections of said fluid line between said valves; a second fluid line extending from said T; a cylinder; a piston rod secured to said second spool valve and having a piston located within said cylinder; a spring extending between said second spool valve and said cylinder; said second fluid line being in communication with said cylinder; sump lines extending from each of said valves to said supply source; and a line sump chamber in said sump line extending from said first spool valve.

13. In an aircraft, the combination comprised of: a vehicle having main gear skids and a swiveling nose gear; a wheel mounted on one end of said nose gear; a sprocket secured to the other end of said nose gear; a fluid motor having a sprocket; a chain linking said sprockets; a first spool valve; fluid lines connecting said motor and first valve; initiator means for activating the system; selector means coordinated with said initiator means; wires extending to first solenoid valve actuators located at each end of said first spool valve; connector rods and springs connecting each of said first actuators to said first spool valve; an electrical power source in communication with said selector means; a second spool valve; said selector means having spaced bosses on one side thereof; an I-shaped member having a first flange abutting said bosses and a second flange to which is secured a spring; said spring secured to a plate from which extends a bar; one end of said bar pivoted to a lever mounted on a fulcrum; contact points attached to opposite sides of an extension of said lever; contacts adjacent but spaced from said contact points; wires extending from said contacts to second solenoid valve actuators located at each end of said second spool valve; connector rods and springs connecting each of said second actuators to said second spool valve; a fluid line extending from a fluid supply source to said second valve to said first valve; a three-way connector connecting two sections of said fluid line; a second fluid line extending from said three-way connector; one end of a bar extension pivoted to said bar and lever; one end of said bar extension secured to a pressure bellows; the other end of said bellows communicating with said second fluid line; sump lines extending from each of said spool valves to said supply source; and a line sump chamber in said sump line extending from said first spool valve.

14. In a steering system, the combination comprising: an aircraft having a nose gear supported therefrom; said nose gear being capable of swiveling; power means for applying limited rotational force to said nose gear to cause said nose gear to be oriented and yieldingly maintained at an angle to the direction of travel of said aircraft to provide a ground reaction establishing directional stability and control of said aircraft; said power means being so constructed and arranged that a force overcoming said ground reaction will result in momentary swivel reversal of said nose gear causing a variation of said angle to vary the ground reaction and establish directional stability of said aircraft.

15. In an aircraft, the combination comprising: an aircraft having a fuselage; main gear skids; a nose gear capable of swiveling; said nose gear having a wheel; power means for applying a torque to said nose gear to cause it to be oriented and yieldingly maintained at an angle to the direction of travel of the aircraft while permitting said nose gear to retain its swiveling characteristic; said power means so constructed and arranged that an external force acting against the aircraft will cause a variation of said angle; and control means for selectively determining direction and amount of torque applied to said nose gear by said power means, whereby external forces on the aircraft are opposed so as to permit maintenance of aircraft directional stability and control.

16. In a steering system, the combination comprising: a vehicle having a wheeled support therefor; said wheeled support being capable of swiveling; power means for applying limited rotational force to said wheeled support to cause said wheeled support to be oriented and yieldingly maintained at an angle to the direction of travel of said vehicle to provide a ground reaction establishing directional stability and control of said vehicle; said power means being so constructed and arranged that a force overcoming said ground reaction will result in momentary swivel reversal of said wheeled support causing a variation of said angle to vary the ground reaction.

17. The method of steering a vehicle comprising the steps of: providing a vehicle with at least one swiveling support; actuating a fluid motor for applying a torque to said swiveling support; applying a torque to said swiveling support for said vehicle; yawing said swiveling support at an angle to the direction of travel of said vehicle; yieldingly maintaining said swiveling support at the yaw angle while permitting said swiveling support to retain its swiveling characteristic whereby variations in the lateral forces acting upon the vehicle are able to swivel the support to permit maintenance of directional stability.

References Cited by the Examiner
UNITED STATES PATENTS

| 2,308,846 | 1/43 | White | 244—50 |
| 2,734,589 | 2/56 | Green | 244—50 |
| 2,957,535 | 10/60 | Helgeson | 180—79.2 |

FOREIGN PATENTS 767,859 2/57 Great Britain.

MILTON BUCHLER, *Primary Examiner.*

FERGUS S. MIDDLETON, *Examiner.*